(12) United States Patent
Taylor et al.

(10) Patent No.: US 11,030,773 B2
(45) Date of Patent: *Jun. 8, 2021

(54) HAND TRACKING BASED ON ARTICULATED DISTANCE FIELD

(71) Applicant: Google LLC, Mountain View, CA (US)

(72) Inventors: Jonathan James Taylor, Mountain View, CA (US); Vladimir Tankovich, Renton, WA (US); Danhang Tang, Mountain View, CA (US); Cem Keskin, San Francisco, CA (US); Adarsh Prakash Murthy Kowdle, San Francisco, CA (US); Philip L. Davidson, Arlington, MA (US); Shahram Izadi, Tiburon, CA (US); David Kim, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/798,881

(22) Filed: Feb. 24, 2020

(65) Prior Publication Data
US 2020/0193638 A1    Jun. 18, 2020

Related U.S. Application Data

(63) Continuation of application No. 15/994,563, filed on May 31, 2018, now Pat. No. 10,614,591.
(Continued)

(51) Int. Cl.
*G06K 9/00* (2006.01)
*G06T 7/73* (2017.01)
(Continued)

(52) U.S. Cl.
CPC ............ *G06T 7/75* (2017.01); *G06K 9/00382* (2013.01); *G06K 9/00389* (2013.01);
(Continued)

(58) Field of Classification Search
CPC ........... G06T 7/75; G06T 7/162; G06T 7/194; G06T 7/149; G06T 7/251; G06T 7/74;
(Continued)

(56) References Cited

U.S. PATENT DOCUMENTS 5,454,043 A * 9/1995 Freeman ............... A61B 5/1121
345/419
9,734,393 B2 * 8/2017 Wang ...................... G06F 3/011
(Continued)

FOREIGN PATENT DOCUMENTS

CN         102262438 A     11/2011
CN         103858148 A      6/2014
(Continued)

OTHER PUBLICATIONS

English Translation of Chinese Office Action dated Jul. 17, 2020 for CN Application No. 201880036103.X, 11 pages.
(Continued)

*Primary Examiner* — Van D Huynh (57) ABSTRACT

An electronic device estimates a pose of a hand by volumetrically deforming a signed distance field using a skinned tetrahedral mesh to locate a local minimum of an energy function, wherein the local minimum corresponds to the hand pose. The electronic device identifies a pose of the hand by fitting an implicit surface model of a hand to the pixels of a depth image that correspond to the hand. The electronic device uses a skinned tetrahedral mesh to warp space from a base pose to a deformed pose to define an articulated signed distance field from which the hand tracking module derives candidate poses of the hand. The electronic device then minimizes an energy function based on the distance of each corresponding pixel to identify the candidate pose that most closely approximates the pose of the hand.

20 Claims, 6 Drawing Sheets

Related U.S. Application Data (60) Provisional application No. 62/513,199, filed on May 31, 2017.

(51) Int. Cl.
  *G06T 7/246* (2017.01)
  *G06T 7/149* (2017.01)
  *G06T 7/194* (2017.01)
  *G06T 7/162* (2017.01)
  *G06F 3/01* (2006.01)

(52) U.S. Cl.
  CPC .............. *G06T 7/149* (2017.01); *G06T 7/162* (2017.01); *G06T 7/194* (2017.01); *G06T 7/251* (2017.01); *G06T 7/74* (2017.01); *G06F 3/017* (2013.01); *G06T 2207/10016* (2013.01); *G06T 2207/10028* (2013.01); *G06T 2207/20076* (2013.01); *G06T 2207/20081* (2013.01); *G06T 2207/30196* (2013.01)

(58) Field of Classification Search
  CPC . G06T 2207/10016; G06T 2207/20076; G06T 2207/20081; G06T 2207/30196; G06T 2207/10028; G06K 9/00382; G06K 9/00389; G06F 3/017
  USPC .......................................................... 382/103
  See application file for complete search history.

(56) References Cited

U.S. PATENT DOCUMENTS

| | | | |
|---|---|---|---|
| 10,318,008 B2* | 6/2019 | Sinha | G06K 9/00214 |
| 2010/0215257 A1* | 8/2010 | Dariush | G06K 9/48 |
| | | | 382/159 |
| 2013/0236089 A1* | 9/2013 | Litvak | G06K 9/00201 |
| | | | 382/154 |
| 2013/0329011 A1* | 12/2013 | Lee | G06T 19/20 |
| | | | 348/46 |
| 2016/0086349 A1* | 3/2016 | Shotton | G06T 7/75 |
| | | | 382/103 |
| 2016/0335486 A1* | 11/2016 | Fleishman | G06T 7/75 |
| 2016/0364912 A1* | 12/2016 | Cho | G06K 9/00214 |
| 2017/0011519 A1* | 1/2017 | Ohba | G06K 9/00375 |
| 2017/0140552 A1* | 5/2017 | Woo | G06T 7/73 |

FOREIGN PATENT DOCUMENTS

| | | |
|---|---|---|
| CN | 105654492 A | 6/2016 |
| CN | 107992858 A | 5/2018 |

OTHER PUBLICATIONS

Office Action dated Jan. 21, 2021 for Chinese Patent Application No. 201880036103.X, 7 pages.

Office Action dated Jan. 13, 2021 for European Patent Application No. 18 755 602.2, 5 pages.

Taylor, Jonathan, et al., Articulated Distance Fields for Ultra-Fast Tracking of Hands Interacting, ACM Transactions on Graphics, vol. 36, No. 4, Article 244, Nov. 2017.

* cited by examiner

HAND TRACKING BASED ON ARTICULATED DISTANCE FIELD

CROSS-REFERENCE TO RELATED APPLICATIONS

The present application is a continuation of U.S. patent application Ser. No. 15/994,563, entitled "Hand Tracking Based on Articulated Distance Field," filed on May 31, 2017, and which is related to and claims priority to U.S. Provisional Patent Application Serial No. 62/513,199, entitled "Articulated Distance Fields for Ultra-Fast Tracking of Hands Interacting," filed May 31, 2017, the entirety of which are incorporated by reference herein. The present application claims priority to and benefit of applications 15/994,563 and 62/513,199 and incorporates all such applications herein by reference.

BACKGROUND

Field of the Disclosure

The present disclosure relates generally to imagery capture and processing and more particularly to hand tracking using captured imagery.

Description of the Related Art

Hand tracking allows articulated hand gestures to be used as an input mechanism for virtual reality and augmented reality systems, thereby supporting a more immersive user experience. A generative hand tracking system captures images and depth data of the user's hand and fits a generative model to the captured image or depth data. To fit the model to the captured data, the hand tracking system defines and optimizes an energy function to find a minimum that corresponds to the correct hand pose. However, conventional hand tracking systems typically have accuracy and latency issues that can result in an unsatisfying user experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The following description is intended to convey a thorough understanding of the present disclosure by providing a number of specific embodiments and details involving estimating a pose of a hand by volumetrically deforming a signed distance field based on a skinned tetrahedral mesh. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-11 illustrate techniques for estimating a pose of at least one hand by volumetrically deforming a signed distance field using a skinned tetrahedral mesh to locate a local minimum of an energy function, wherein the local minimum corresponds to the hand pose. A hand tracking module receives depth images of a hand from a depth camera and identifies a pose of the hand by fitting an implicit surface model of a hand, defined as the zero crossings of an articulated signed distance function, to the pixels of a depth image that correspond to the hand. The hand tracking module fits the model to the pixels by first volumetrically warping the pixels into a base pose and then interpolating 3D grid of precomputed signed distance values to estimate the distance to the implicit surface model. The volumetric warp is performed using a skinned tetrahedral mesh. The hand tracking module uses the skinned tetrahedral mesh to warp space from a base pose to a deformed pose to define an articulated signed distance field from which the hand tracking module derives candidate poses of the hand. Explicitly generating the articulated signed distance function is, however, avoided, by instead warping the pixels from the deformed pose to the base pose where the distance to the surface can be estimated by interpolating the precomputed 3D grid of signed distance values. The hand tracking module then minimizes the energy function based on the distance of each corresponding pixel as to identify the candidate pose that most closely approximates the pose of the hand.

In some embodiments, the hand tracking module initializes the candidate poses using the pose from the previous frame, that is, the depth image immediately preceding the current depth image. The hand tracking system leverages a depth camera with an extremely high frame rate to minimize the difference between the true pose from the previous frame and the true pose in the current frame. In some embodiments, the hand tracking module further initializes the candidate poses by a predicted pose. To predict a pose, the hand tracking module segments the pixels of the depth images based on a probability for each pixel representing a left hand, a right hand, or a background. The hand tracking module generates a three-dimensional (3D) point cloud of at least one of the left hand and the right hand based on the corresponding pixels and predicts a global orientation of the hand based a comparison of the 3D point cloud to a plurality of known poses to generate the predicted current pose.

Figure 1:
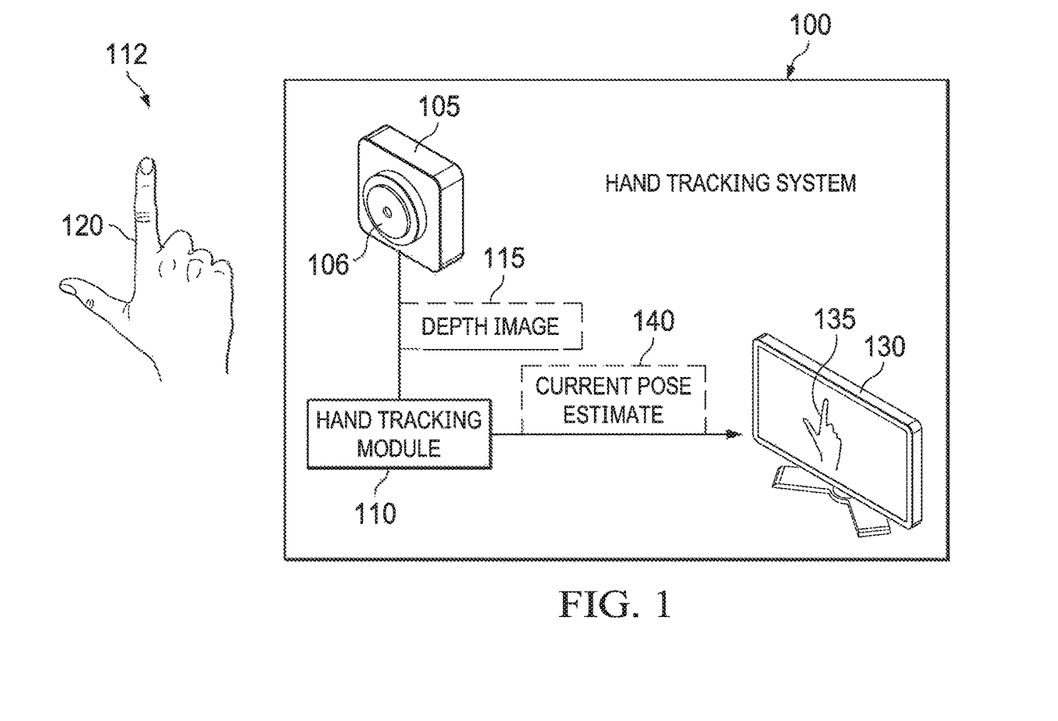
FIG. 1 is a diagram illustrating a hand tracking system estimating a current pose of a hand based on a depth image in accordance with at least one embodiment of the present disclosure.

FIG. 1 illustrates a hand tracking system 100 configured to support hand tracking functionality for AR/VR applications, using depth sensor data in accordance with at least one embodiment of the present disclosure. The hand tracking system 100 can include a user-portable mobile device, such as a tablet computer, computing-enabled cellular phone (e.g., a "smartphone"), a head-mounted display (HMD), a notebook computer, a personal digital assistant (PDA), a gaming system remote, a television remote, camera attachments with or without a screen, and the like. In other embodiments, the hand tracking system 100 can include another type of mobile device, such as an automobile, robot, remote-controlled drone or other airborne device, and the like. For ease of illustration, the hand tracking system 100 is generally described herein in the example context of a mobile device, such as a tablet computer or a smartphone; however, the hand tracking system 100 is not limited to these example implementations. The hand tracking system 100 includes a hand tracking module 110 estimating a current pose 140 of a hand 120 based on a depth image 115 captured by a depth camera 105 in accordance with at least one embodiment of the present disclosure. In this example, the hand 120 is a right hand making a pointing gesture, with the thumb and index finger extended and the remaining fingers curled down to the palm.

The depth camera 105, in one embodiment, uses a modulated light projector (not shown) to project modulated light patterns into the local environment, and uses one or more imaging sensors 106 to capture reflections of the modulated light patterns as they reflect back from objects in the local environment 112. These modulated light patterns can be either spatially-modulated light patterns or temporally-modulated light patterns. The captured reflections of the modulated light patterns are referred to herein as "depth images" 115. In some embodiments, the depth camera 105 calculates the depths of the objects, that is, the distances of the objects from the depth camera 105, based on the analysis of the depth images 115.

The hand tracking module 110 receives a depth image 115 from the depth camera 105 and identifies a pose of the hand 120 by fitting a hand model to the pixels of the depth image 115 that correspond to the hand 120. In some embodiments, the model is parameterized by 28 values (e.g., four joint articulations of each of the five fingers, two degrees of freedom at the wrist, and six degrees of freedom for global orientation). In some embodiments, the hand tracking module 110 parameterizes the global rotation of the model using a quaternion so that the pose vector θ is 29-dimensional. The hand tracking module 110 segments out of and back projects from the depth image 115 a set of 3D data points corresponding to the hand 120. The hand tracking module 110 then fits a parameterized implicit surface model $S(θ) \subseteq \mathbb{R}^3$, formulated as the zero crossings of an articulated signed distance function, to the set of 3D data points $\{x_n\}_{n=1}^{N} \subseteq \mathbb{R}^3$. The hand tracking module 110 minimizes the distance from each 3D data point to the surface by minimizing the energy $$E_{data}(θ) = \sum_{n=1}^{N} D(x_n, θ)^2 = \sum_{n=1}^{N} \min_{y \in s(θ)} \|x_n - y\|^2 \qquad (1)$$

where $E_{data}(θ)$ is the energy of the pose θ, $D(x_n,θ)$ is the distance from each 3D data point $x_n$ to the nearest pointy of the surface model in the pose θ, and N is the number of 3D data points in the set.

To facilitate increased accuracy and efficiency of minimizing the energy, the hand tracking module 110 defines the distance D (x, θ) to an implicit surface of the hand model in a way that is relatively easy and fast to compute. The hand tracking module 110 builds a tetrahedral mesh (not shown) and skins the vertices to a skeleton (not shown). By defining x in relation to its barycentric coordinates in a tetrahedron of the mesh, the hand tracking module 110 defines a function that warps the space from a base pose to a deformed pose, as is described in more detail below. Based on the deformed pose, the hand tracking module 110 defines an articulated signed distance field. A point in the space of the current pose can be warped back to the base pose where the distance to the surface can be estimated efficiently by interpolating a precomputed 3D grid of signed distances. The hand tracking module 110 leverages this as part of its process to rapidly estimate a current pose 140 of the hand 120.

In some embodiments, the hand tracking module 110 uses the current pose estimate 140 to update graphical data 135 on a display 130. In some embodiments, the display 130 is a physical surface, such as a tablet, mobile phone, smart device, display monitor, array(s) of display monitors, laptop, signage and the like or a projection onto a physical surface. In some embodiments, the display 130 is planar. In some embodiments, the display 130 is curved. In some embodiments, the display 130 is a virtual surface, such as a three-dimensional or holographic projection of objects in space including virtual reality and augmented reality. In some embodiments in which the display 130 is a virtual surface, the virtual surface is displayed within an HMD of a user. The location of the virtual surface may be relative to stationary objects (such as walls or furniture) within the local environment 112 of the user.

Figure 2:
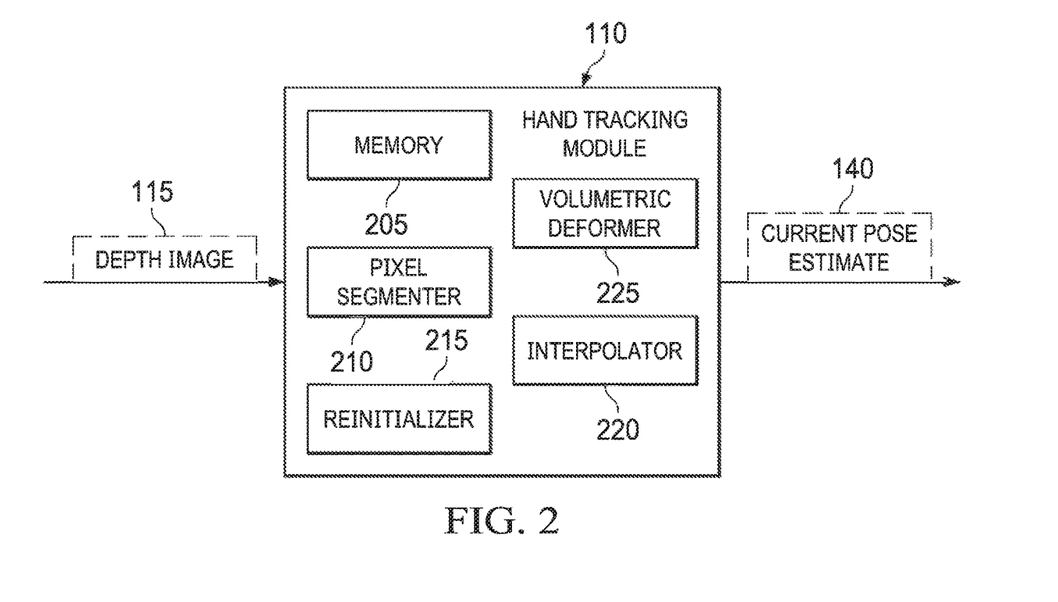
FIG. 2 is a diagram illustrating a hand tracking module of the hand tracking system of FIG. 1 configured to estimate a current pose of a hand based on a depth image in accordance with at least one embodiment of the present disclosure.

FIG. 2 is a diagram illustrating the hand tracking module 110 of the hand tracking system 100 of FIG. 1 in accordance with at least one embodiment of the present disclosure. The hand tracking module 110 includes a memory 205, a pixel segmenter 210, a reinitializer 215, an interpolator 220, and a volumetric deformer 225. Each of these modules represents hardware, software, or a combination thereof, configured to execute the operations as described herein. The hand tracking module 110 is configured to receive a depth image 115 from the depth camera (not shown) and to generate a current pose estimate 140 based on the depth image 115.

The memory 205 is a memory device generally configured to store data, and therefore may be a random access memory (RAM) memory module, non-volatile memory device (e.g., flash memory), and the like. The memory 205 may form part of a memory hierarchy of the hand tracking system 100 and may include other memory modules, such as additional caches not illustrated at FIG. 1. The memory 205 is configured to receive and store the depth image 115 from the depth camera (not shown).

The pixel segmenter 210 is a module configured to segment the pixels of the depth image 115 into pixels corresponding to a left hand, a right hand, and a background. In some embodiments, the pixel segmenter 210 assigns a probability for each pixel of the depth image 115 as corresponding to a left hand $p^{left}$, a right hand $p^{right}$, and a background $p^{bg} \in [0,1]$ to produce a probability map P. In some embodiments, the pixel segmenter 210 thresholds P with a high value $\eta^{high} \in [0,1]$, convolves the output with a large bandwidth Gaussian filter, and then finds the location of the maximum value, which the hand segmenter 210 assigns as a hand position. The hand segmenter 210 then thresholds P with a smaller value $\eta^{low}$ and intersects P with a sphere of radius $r^{sphere} \in \mathbb{R}$ to segment the hand pixels.

In some embodiments, the pixel segmenter 210 also trains a Randomized Decision Forest (RDF) classifier to produce P. The RDF classifier (not shown) employs depth and translation invariant features which threshold the depth difference of two pixels at depth-normalized offsets around the central pixel. For each pixel p at coordinate (u, v), on a depth image I, each split node in the tree evaluates the function:

$$I\left(u + \frac{\Delta u_1}{\Gamma}, v + \frac{\Delta v_1}{\Gamma}\right) - I\left(u + \frac{\Delta u_2}{\Gamma}, v + \frac{\Delta v_2}{\Gamma}\right) > \tau \quad (2)$$

where is $\Gamma$ is I(u,v), $\Delta u_i$ and $\Delta v_i$ are the two offsets and $\tau$ is the threshold for that split node. In some embodiments, to enhance the feature pool for subtasks that are invariant to rotations, such as a single extended hand, the pixel segmenter 210 introduces a new rotationally invariant family of features, which threshold the average depth of two co-centric rings:

$$\frac{R(u, v, r_1, I)}{K} - \frac{R(u, v, r_2, I)}{K} > \tau \quad (3)$$

where R(u,v,r,I) is the sum over K depth pixels found on a ring of depth-scaled radius r around the central pixel. In some embodiments, the pixel segmenter 210 approximates the ring with a fixed number of points k:

$$R = \sum_{i=1}^{k} I\left(u + \frac{r\cos(i2\pi/k)}{\Gamma}, v + \frac{r\sin(i2\pi/k)}{\Gamma}\right). \quad (4)$$

In some embodiments, the pixel segmenter 210 additionally defines a unary version of this feature as follows:

$$\frac{R(u, v, r_1, I)}{k} - \Gamma > \tau \quad (5)$$

At training time, the pixel segmenter 210 samples from a pool of binary and unary rotationally dependent and invariant features based on a learned prior pose. In some embodiments, for each considered feature, the pixel segmenter 210 uniformly samples multiple $\tau$ values from a fixed range and selects the value that maximizes the information gain. The pixel segmenter 210 outputs a segmented depth image R per hand.

In some embodiments, the pixel segmenter 210 uses a convolutional neural network (CNN) or a randomized decision forest (RDF) or both to produce a probability map that encodes for each pixel, the probability of the pixel belonging to the left hand, the right hand, and the background, respectively. To detect the right hand, the pixel segmenter 210 temporarily sets all values of the probability map $p^{right}$ to zero that are below a high value $\eta^{high} \in [0,1]$. The pixel segmenter 210 convolves the output with a large bandwidth Gaussian filter, and then uses the location of the maximum value. The pixel segmenter 210 then removes outliers from the original segmentation $p_{right}$ by setting to zero the value of any pixels whose probability is less than $\eta^{low} \in [0,\eta^{high}]$ or whose 3D location is not contained in a sphere of radius $r^{sphere} \in \mathbb{R}$ around the hand detection. The pixel segmenter 210 thus ensures that pixels far from the most prominent hand (e.g., pixels on other people's hands in the background) do not contaminate the segmentation while allowing the machine learning method to discard nearby pixels that are recognized as not belonging to the hand (e.g., pixels on the user's chest). The hand segmenter 210 back projects the pixels that pass the test into 3D space using the depth camera 105 parameters to form a point cloud $\{x_n\}_{n=1}^{N} \subseteq \mathbb{R}^3$ as to define the energy $$E_{data}(\theta) = \sum_{n=1}^{N} D(x_n; \theta)^2 = \sum_{n=1}^{N} \min_{y \in s(\theta)} \|x_n - y\|^2 \quad (6)$$

The reinitializer 215 receives the segmented depth image R from the pixel segmenter 210. The reinitializer 215 resets the hand tracking module 110 by generating a coarse global predicted pose when the hand tracking module 110 loses track of the hand 120 of FIG. 1. In some embodiments, the hand tracking module 110 uses coarse global predicted pose as a candidate pose of the hand. In some embodiments, the reinitializer 215 uses an RDF to estimate the six degrees of freedom (6 DOF) hand pose by locating three joints on the palm, which is assumed to be planar. The three joints are the wrist joint $q_w$, the base of the metacarpophalangeal (MCP) joint $q_i$, and the base of the pinky MCP $q_p$. The reinitializer 215 locates the three joints by evaluating each pixel p in R to produce a single vote for the three-dimensional (3D) offset of each joint relative top. The trees of the RDF are trained with a regression objective to minimize the vote variance in the leaves. Each pixel votes for all the joints, which are aggregated separately to form a vote distribution per joint. The reinitializer 215 selects the modes of the distributions as final estimates for the three joints. In some embodiments, the reinitializer 215 converts the three joints into a reinitialization pose by setting the global translation to $q_w$ and deriving the global orientation by finding the orientation of the three-dimensional triangle defined by the three joints. The reinitializer 215 then samples a set of finger poses randomly from the prior pose to generate the coarse global predicted pose.

The interpolator 220 precomputes a 3D grid of signed distance values in a base pose $\theta_0$ and uses tricubic interpolation to define a signed distance $D(x,\theta_0)=\tilde{D}(x) \in \mathbb{R}$ to the surface for any point $x \in \mathbb{R}^3$. Tricubic interpolation gives access to smooth first and second order derivatives with respect to x. Thus, the signed distance field smoothly captures details of the model using tricubic interpolation.

The volumetric deformer 225 uses a linear skinned tetrahedral mesh to define a signed distance field into an arbitrary pose θ as a volumetric warp of the signed distance field of the interpolator 220. Instead of explicitly generating the deformed signed distance function, the volumetric deformer 225 can efficiently warp a point in the current pose back into the base pose so the distance to the implicit surface, and its derivatives, can be rapidly estimated by the interpolator. The volumetric deformer 225 defines the deformation of the vertices of the tetrahedral mesh via linear blend skinning.

Strictly speaking, the tetrahedral mesh actually defines a warp $y=W(x,\theta)$ from the base pose to the deformed pose. The function is largely invertible, such that the set of points in the base pose that deform to a point in the current pose is typically 1, unless the deformation causes tetrahedra to self-intersect. In the latter case, the ambiguity is resolved by simply picking the point in the base pose with a smaller absolute distance to the implicit surface as defined by the interpolator 220. This thus defines a function $W^{-1}(x,\theta)$ that warps the space from the deformed pose to the base pose. The distance to the surface $D(x,\theta)$ for an arbitrary pose θ is thus defined as $D(x,\theta)=\tilde{D}(W^{-1}(x,\theta))$, which can be easily evaluated without explicitly generating a dense signed distance field in the deformed pose. Thus, the tetrahedral mesh transforms the detail of the signed distance field into different poses. The tetrahedral mesh warp introduces artifacts only at articulation points, which can be addressed by densifying the tetrahedral mesh only at the articulation points.

The hand tracking module 110 composes the precomputed signed distance field $\tilde{D}(x) \in R$ from the interpolator 220 and the volumetric deformation $W(x,\theta)$ from the skinned volumetric tetrahedral mesh to define an articulated signed distance field $D(x,\theta)=\tilde{D}(W^{-1}(x,\theta))$ that yields the estimated distance to the surface of the point x in the estimated pose. The hand tracking module 110 uses the articulated signed distance field $D(x,\theta)$ to define an energy function $E(\theta)=\Sigma_{n=1}^{N}D(x_n,\theta)^2$, although other terms encoding prior knowledge could be incorporated.

In some embodiments, the hand tracking module 110 initializes the candidate poses θ first using the pose $\theta_{prev}$ output from the system in the previous frame. In some embodiments, the hand tracking module 110 initializes further candidate poses θ by using a coarse global predicted pose $\theta_{pred}$ generated by the reinitializer 215. In some embodiments, the depth camera (not shown) employs a high frame rate, such that the difference between the pose $\theta_{prev}$ in the previous frame and the true pose in the current frame is minimized. By minimizing the energy function, the hand tracking module 110 generates a current pose estimate 140.

In some embodiments, the hand tracking module 110 tracks two hands by jointly) optimizing over poses $\Theta=\{\theta^{left}, \theta^{right}\}$ and a set of right handed assignments $Y=\{\eta_n\}_{n=1}^{N} \subseteq \{0,1\}^N$ which implicitly define a set of left handed assignments $\Gamma(Y)=\{1-\eta_n\}_{n=1}^{N}$. The hand tracking module 110 then formulates the full energy to be optimized as $$\tilde{E}(\Theta)=E(\theta^{left};\Gamma(Y))+E(\theta^{right};(Y)+\lambda_{assign}\Sigma_{n=1}^{N}(\eta_n\gamma_n^{right}+(1-\eta_n)\gamma_n^{left}) \quad (7)$$

where $\gamma_n^{right}$ and $\gamma_n^{left}$ are penalties output from the segmentation forest for assigning data point n to the right and the left hand pose, respectively. To optimize this function, the hand tracking module 110 performs alternation between Θ and γ, updating Θ with Levenberg updates and updating γ by discretely considering whether assigning the data point to the left or right hand will lower the energy.

Figure 3:
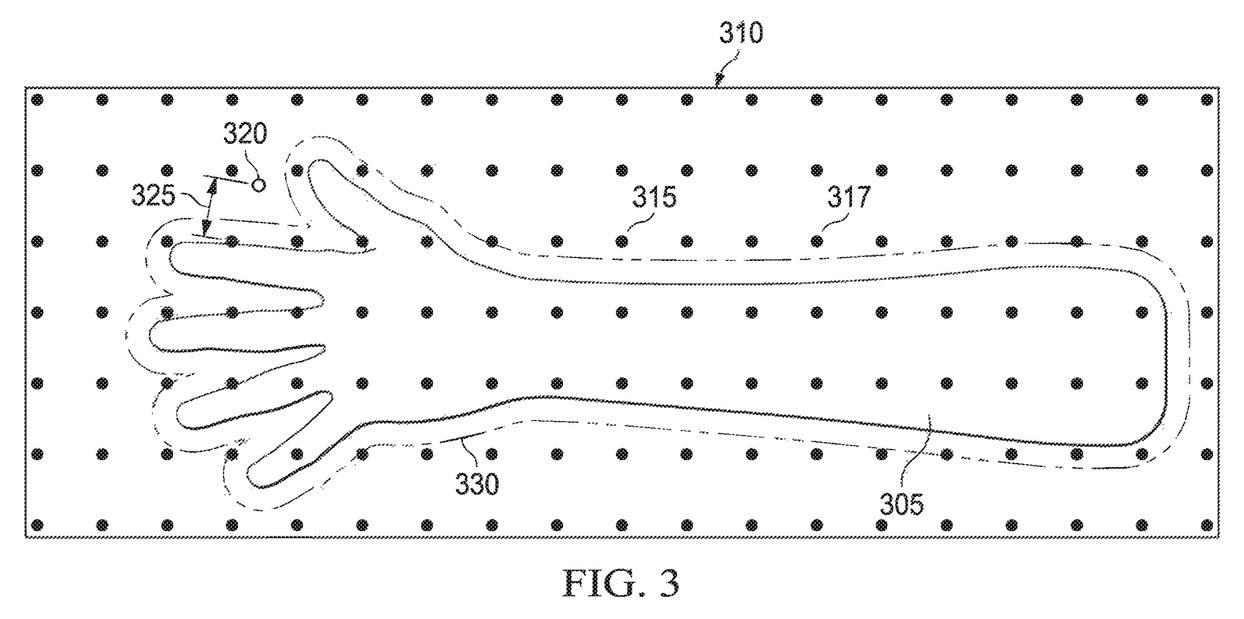
FIG. 3 is a diagram illustrating interpolation of a grid of precomputed signed distances to generate a smooth signed distance field for estimating a distance from a point to a model in accordance with at least one embodiment of the present disclosure.

FIG. 3 illustrates interpolation of a pixel 320 of a depth image based on a precomputed distance function to generate a smooth signed distance field (SDF) 330 for estimating a distance 325 from the pixel 320 to a model 305 in a base pose $\theta_0$ in accordance with at least one embodiment of the present disclosure. The interpolator 220 of FIG. 2 precomputes a dense grid 310 of signed distances 315 in the base pose $\theta_0$. The interpolator 220 then uses tricubic interpolation to define the signed distance function 325 $D(x,\theta)=\tilde{D}(x) \in \mathbb{R}$ to the surface for any point $x \in \mathbb{R}^3$ in the neutral, or base, pose. Precomputing and interpolating the grid of signed distances 315 eases the computational burden of evaluating distances $D(x,\theta)$ and smoothly captures the high frequency details of the model 305.

Figure 4:
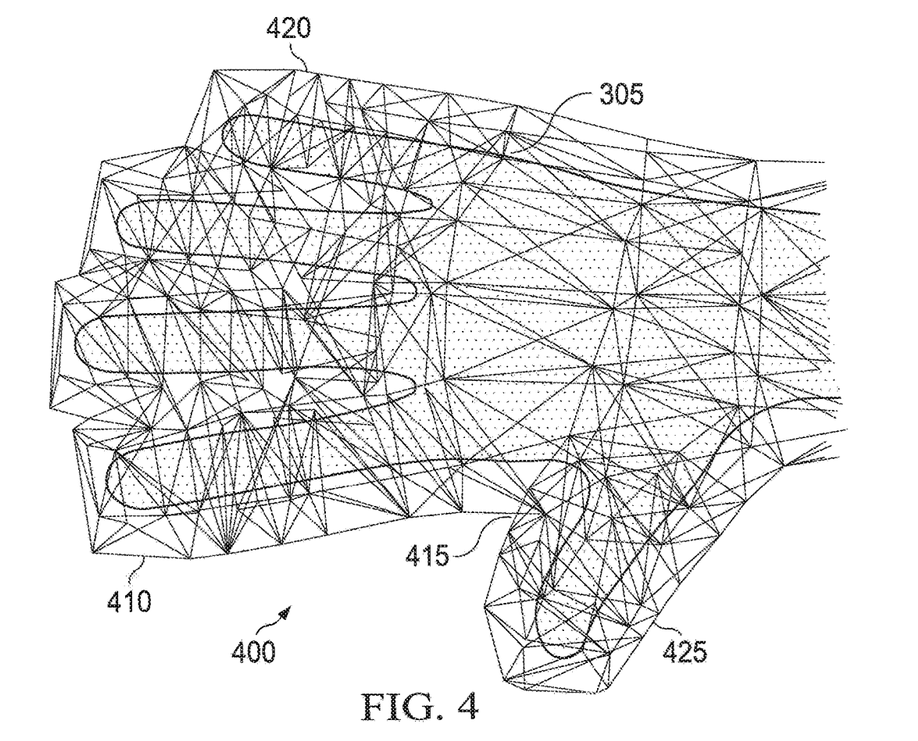
FIG. 4 is a diagram illustrating a base pose of a skinned tetrahedral volumetric mesh in accordance with at least one embodiment of the present disclosure.

FIG. 4 illustrates a base pose 400 of a tetrahedral volumetric mesh 410 of the volumetric deformer 225 of FIG. 2 with vertices skinned to the dense SDF 330 of FIG. 3 in accordance with at least one embodiment of the present disclosure. The skinned tetrahedral mesh 410 transforms the detail of the dense SDF 330 into different poses. The skinned tetrahedral mesh 410 introduces artifacts only at articulation points. In some embodiments, the skinned tetrahedral mesh 410 is densified at the articulation points, e.g., 415, 420, 425, while the dense SDF 330 represents the geometry of the pose in other areas. In some embodiments, the volumetric deformer (not shown) applies arbitrary mesh skinning techniques to deform a single SDF 330. Thus, the deformation function and detail representation are decoupled, allowing a coarse tetrahedral mesh to be used to transfer detailed static geometry represented by the SDF 330. This may also allow the possibility of modifying the static geometry in the SDF 330 online without having to modify the deformation function.

Figure 5:
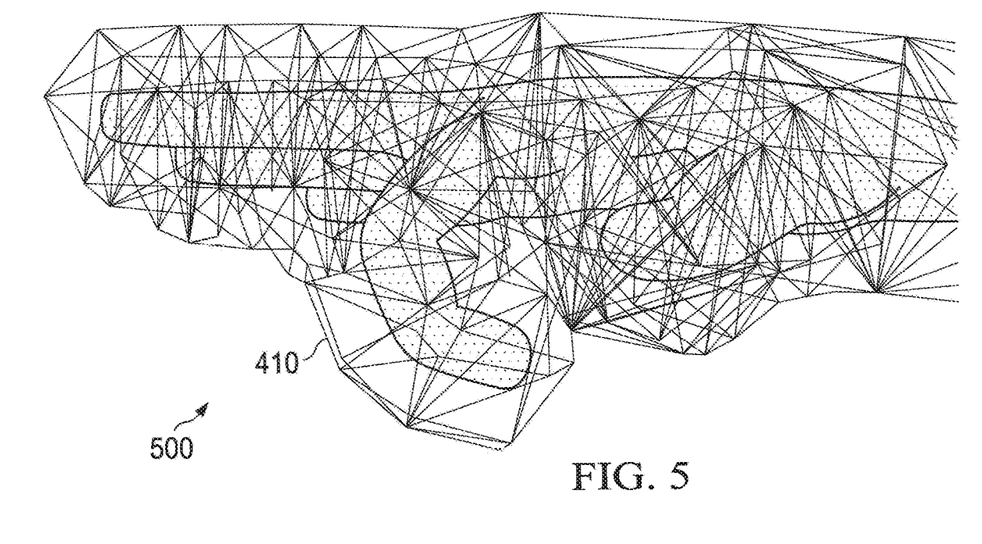
FIG. 5 is a diagram illustrating a deformed pose of the tetrahedral volumetric mesh in accordance with at least one embodiment of the present disclosure.

FIG. 5 illustrates a deformed pose 500 of the tetrahedral volumetric mesh 410 of FIG. 4 in accordance with at least one embodiment of the present disclosure. The volumetric deformer 225 of FIG. 2 uses the tetrahedral volumetric mesh 410 to warp a point x to $W(x,\theta)$. Thus, the volumetric deformer 225 uses the tetrahedral mesh 410 to provide a function $y=W(x,\theta)$ that warps space from the base pose to a deformed pose. The function is largely invertible, such that it is also possible to define a function $x=W^{-1}(y,\theta)$ that warps the space from the deformed pose to the base pose. This allows the hand tracking module 110 to avoid explicitly warping and densely generating a signed distance function in a new pose which would be prohibitively expensive to perform continually while searching for a correct pose. Instead, the hand tracking module 110 can estimate the distance $D(x,\theta)$ of a point x to the implicit surface in any pose θ by instead warping x back into the base pose where the distance to the surface can be rapidly evaluated by interpolating a precomputed 3D grid of signed distance values. Further, as the warp and the signed distance field are differentiable almost everywhere, the hand tracking module 110 can also rapidly query derivatives to enable rapid local search of energy functions defined in terms of distances to the surface.

Figure 6:
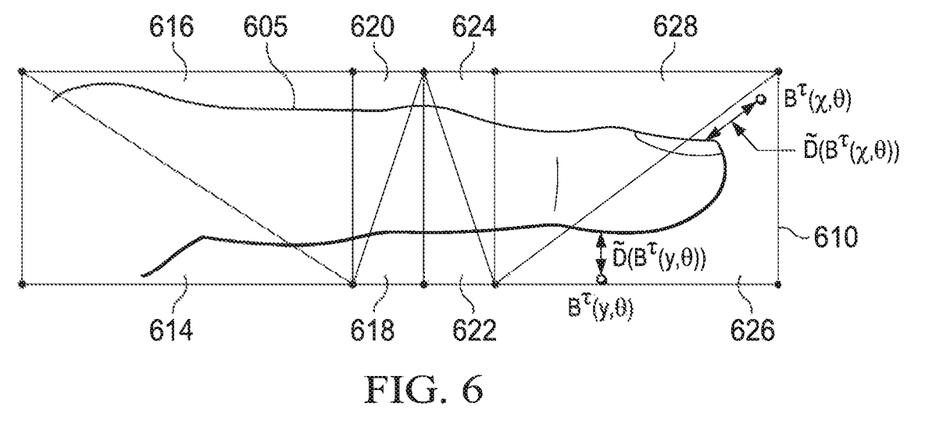
FIG. 6 is a diagram illustrating a two-dimensional cross-section of the end of a finger in a base pose contained inside a triangular mesh in accordance with at least one embodiment of the present disclosure.

FIG. 6 illustrates a two-dimensional (2D) cross-section of the end of a finger 605 in a base pose contained inside a triangular mesh 610 in accordance with at least one embodiment of the present disclosure. The tetrahedral volumetric mesh 410 of FIGS. 4 and 5 is depicted as a 2D equivalent triangular mesh 610 for ease of reference. The triangular mesh 610 includes triangles 614, 616, 618, 620, 622, 624, 626, and 628.

Figure 7:
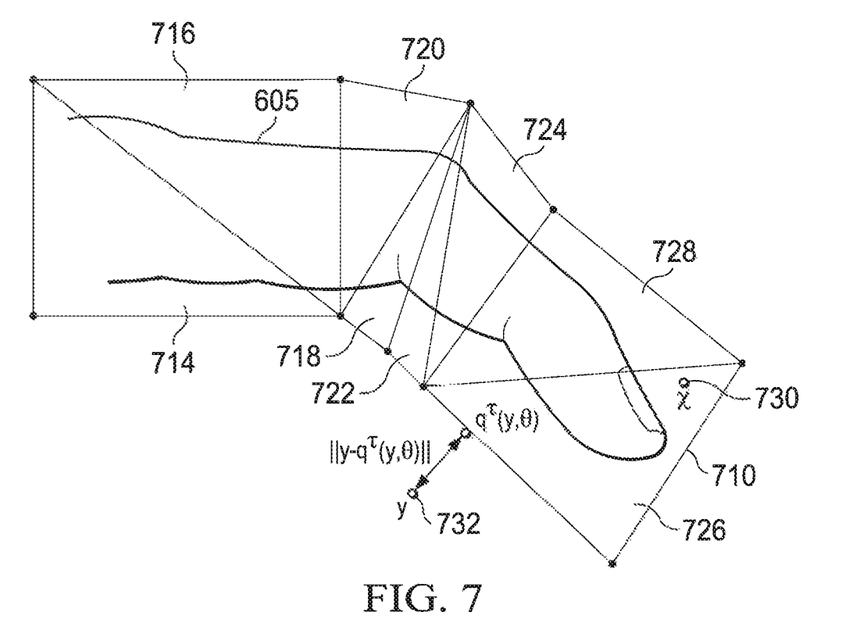
FIG. 7 is a diagram illustrating a two-dimensional cross-section of the end of a finger in a query pose contained inside a deformed triangular mesh in accordance with at least one embodiment of the present disclosure.

FIG. 7 illustrates a 2D cross-section of the end of the finger 605 of FIG. 6 in a query pose θ contained inside a deformed triangular mesh 710 in accordance with at least one embodiment of the present disclosure. A triangular mesh in 2D is the analogue of a tetrahedral mesh in 3D and is thus used to more simply illustrate the technique. The tetrahedral mesh (illustrated as triangular mesh 710) includes tetrahedra (illustrated as triangles 714, 716, 718, 720, 722, 724, 726, and 728), which correspond to tetrahedra (or triangles) 614, 616, 618, 620, 622, 624, 626, and 628, respectively, of FIG. 6. When the mesh 710 is deformed, each tetrahedra (or triangle) 714, 716, 718, 720, 722, 724, 726, and 728 defines an affine transform between the base pose of FIG. 6 and the query pose θ. This defines a volumetric warp $W(x,\theta)$ from the base pose to the query pose. Using the inverse affine transforms of each tetrahedra (or triangle), one can try to define an inverse warp $W^{-1}(x,\theta)$. Using this, the volumetric deformer 225 of FIG. 2 implicitly defines a signed distance field $D(x,\theta)$ as described further herein. For a query point x (e.g., point 730) that falls inside the deformed mesh 710, a tetrahedra (or triangle) τ that contains the point can use its inverse affine transform sends the query point to $B^\tau(x,\theta)$ where the distance to the implicitly encoded surface can be queried as $\tilde{D}(B^\tau(x,\theta))$. For a pointy (e.g., point 732) that falls outside the deformed mesh 710, the volumetric deformer 225 first measures the distance to the closest point contained in the tetrahedral mesh. To this distance, the volumetric deformer 225 then adds the distance obtained by evaluating the distance of this closest point to the surface using the aforementioned technique.

In more detail, for any point x, the volumetric deformer 225 uses the closest point $q^\tau(x,\theta)=V^\tau(\theta)\hat{\beta}^\tau(x,\theta)$ where τ is the tetrahedron (or triangle) containing the closest point and $V^\tau(\theta) \in \mathbb{R}^{3\times 4}$ (or $\mathbb{R}^{2\times 3}$) is a matrix with the positions of the tetrahedron τ's four vertices (or triangle τ's three vertices) in pose θ stored in its columns and $\hat{\beta}^\tau(x,\theta) \in \mathbb{R}^4$ (or $\hat{\beta}^\tau(x,\theta) \in \mathbb{R}^3$) is the barycentric coordinate of the closest point in the tetrahedron (or triangle) T under pose θ. In some embodiments, the volumetric deformer 225 warps the closest point back to the base pose as $B^\tau(x,\theta)=V^\tau(\theta_0)\hat{\beta}^\tau(x,\theta)$ to query its distance to the implicitly encoded surface. When the query point x lies in the tetrahedral mesh, $q^\tau(x,\theta)=x$, whereas when x lies outside the tetrahedral mesh (e.g., point 732), the volumetric deformer accounts for the additional distance between $q^\tau(x,\theta)$ and x. In some cases, the deformation of the tetrahedral mesh causes the query point x to fall in multiple overlapping tetrahedra, causing the volumetric warp to not be strictly invertible. The volumetric deformer 225 therefore resolves this issue by defining the set of tetrahedra (or triangles) that contain x as $$\mathcal{T}(x,\theta)=\{\tau:q^\tau 9x,\theta)=x\} \quad (8)$$

The volumetric deformer 225 then chooses the tetrahedron (or triangle) $\tau^*(x,\theta)$ that will be used to warp the point back into the base pose as $$\tau^*(x,\theta) = \begin{cases} \operatorname{argmin}_{\tau \in T(x,\theta)} & |\tilde{D}(B^\tau(x,\theta))| \quad \text{when } T(x,\theta) \neq \emptyset \\ \operatorname{argmin}_\tau & \|x - q^\tau(x,\theta)\| \quad \text{when } T(x,\theta) = \emptyset \end{cases} \quad (9)$$

The first case selects the containing tetrahedron (or triangle) which warps the point back of minimum absolute distance to the surface in the base pose. The second case selects the tetrahedron (or triangle) that the point is closest to in the current pose. The volumetric deformer 225 then defines the articulated signed distance function to the surface to be $$D(x,\theta)=\|x-q^{\tau^*(x,\theta)}(x,\theta)\|+\tilde{D}(B^{\tau^*(x,\theta)}(x,\theta)) \quad (10)$$

where the first term measures the distance to the closest point in the selected tetrahedron (or triangle) and the second term warps that closest point back to the base pose to evaluate the signed distance to evaluate its distance to the surface.

Thus, the volumetric deformer 225 divides the space into a discrete set of cells as $\tau^*(x,\theta)$ jumps from one tetrahedron (or triangle) to another. When x lands in at least one tetrahedron (or triangle), the volumetric deformer 225 uses an affine transform defined by the selected tetrahedron (or triangle) to map the space in the current pose back into the base pose for SDF evaluation. When x lands outside the tetrahedral mesh 510 (or triangular mesh 710), the volumetric deformer 225 selects the closest tetrahedron (triangle) and similarly uses the affine transform to warp the closest point on the closest tetrahedron's boundary into the base pose for SDF evaluation. The volumetric deformer 225 adds to this value the distance from x to the closest point on the tetrahedron boundary to compensate for the query point being outside the tetrahedral mesh. In some embodiments, the volumetric deformer 225 adds more tetrahedra (or triangles) to smooth out bumps around joints.

Figure 8:
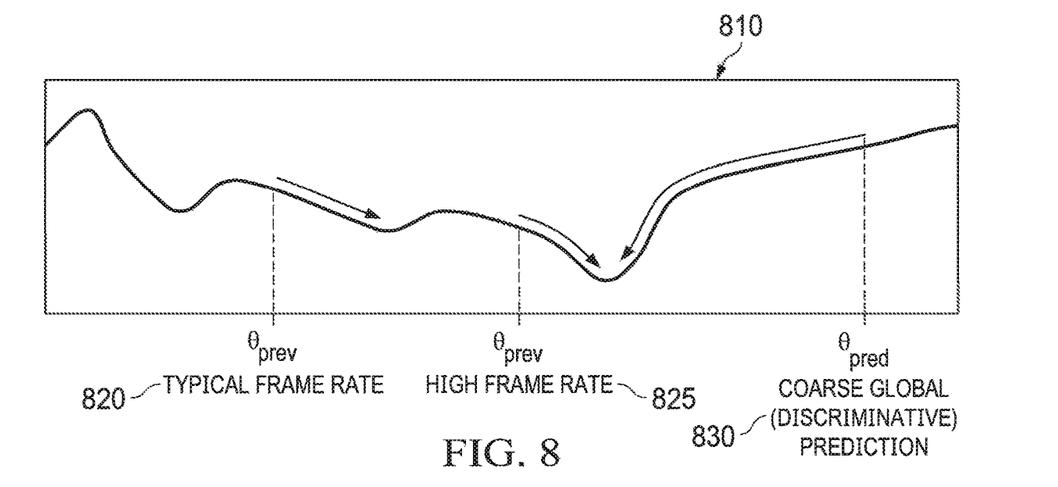
FIG. 8 is a diagram of an energy function based on a distance between each point of a three-dimensional (3D) point cloud based on a depth image and a candidate pose in accordance with at least one embodiment of the present disclosure.

FIG. 8 is a diagram of an energy function 810 of a distance between each point of a three-dimensional (3D) point cloud based on the depth image 115 of FIG. 1 and a candidate pose based on the articulated signed distance function in accordance with at least one embodiment of the present disclosure. The hand tracking module 110 of FIGS. 1 and 2 generates the energy function 810 to evaluate how well the points of the 3D point cloud are explained by the candidate hand pose θ. The hand tracking module 110 defines the energy function as $$E(\theta) = \sum_{n=1}^N \min_{y \in S(\theta)} \|x_n - y\|^2 = \sum_{n=1}^N D(x_n, \theta)^2 \quad (11)$$

The articulated signed distance field defined allows $D(x,\theta)$ to be rapidly queried for distances and derivatives. As a result, the energy function above can be rapidly queried for both its value and descent directions so that rapid local search can be performed from initialization poses.

In some embodiments, the hand tracking module 110 performs a local search to minimize the energy by bounding the candidate pose by the pose from the previous frame 820 of the depth camera 105 of FIG. 1. In some embodiments, the depth camera 105 is a high frame rate depth camera, such that the pose in the previous frame 825 is extremely likely to be close to the true pose in the current frame due to the short time interval between the frames. Rapidly minimizing the aforementioned energy function facilitates processing of depth frames at a high frame rate. In some embodiments, the hand tracking module 110 further initializes the candidate pose by the coarse global predicted pose 830 generated by the reinitializer 215. By initializing the candidate pose by one or both of the pose of the previous frame and the coarse global predicted pose 830, the hand tracking module 110 avoids local minima of the energy function 810.

Figure 9:
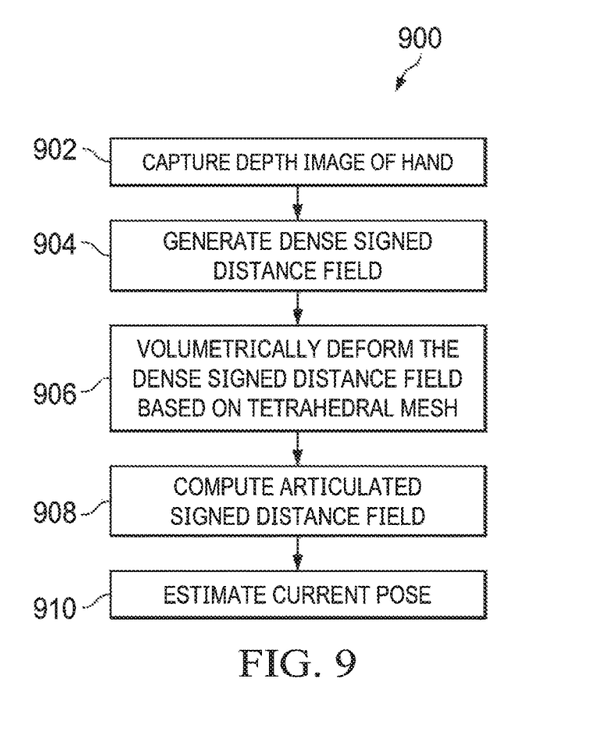
FIG. 9 is a flow diagram illustrating a method of estimating a current pose of a hand based on a captured depth image in accordance with at least one embodiment of the present disclosure.

FIG. 9 is a flow diagram illustrating a method 900 of estimating a current pose of a hand based on a captured depth image in accordance with at least one embodiment of the present disclosure. At block 902, the depth camera 105 of FIG. 1 captures a depth image 115 of the hand 120. At block 904, the interpolator 220 of the hand tracking module 110 defines a dense signed distance field 330 based on the depth image 115. At block 906, the volumetric deformer 225 volumetrically defines the dense signed distance field 330 based on the tetrahedral mesh 510. At block 908, the volumetric deformer 225 defines the articulated signed distance function based on the volumetric deformation of the dense signed distance field 330. At block 910, the hand tracking module 110 minimizes the energy function 810 to estimate the current pose 140 by exploiting the deformer and interpolator that allows extremely rapid querying of distances to the implicit surface, and corresponding derivatives, in arbitrary poses.

Figure 10:
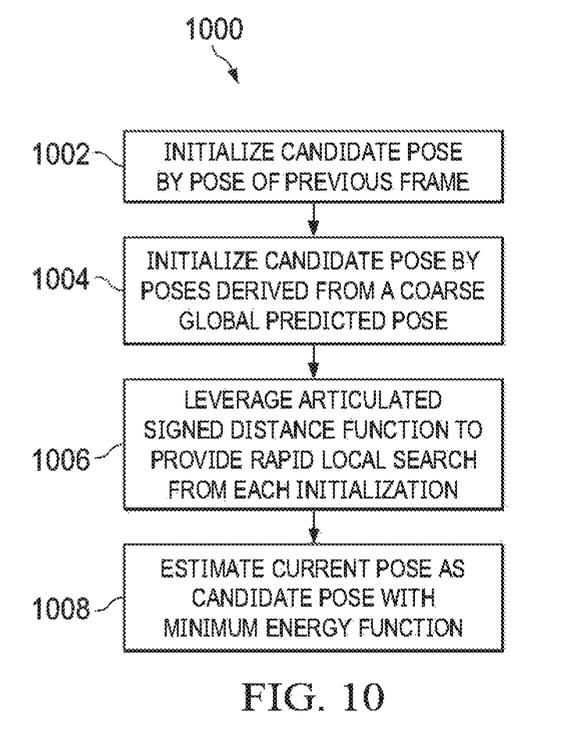
FIG. 10 is a flow diagram illustrating a method of minimizing an energy function by initializing using the pose from the previous frame and one or more poses derived from a coarse global predicted pose in accordance with at least one embodiment of the present disclosure.

FIG. 10 is a flow diagram illustrating a method 1000 of minimizing the energy function 810 for a candidate pose that is initialized by the pose in the previous frame 825 and a coarse global predicted pose 830 in accordance with at least one embodiment of the present disclosure. At block 1002, the hand tracking module 110 sets the pose from the previous frame 825 as a first initialization of the candidate pose. At block 1004, the hand tracking module 110 sets the coarse global predicted pose 830 as a second initialization of the candidate pose. At block 1006, the hand tracking module 110 leverages an articulated signed distance function to provide rapid local search from each initialization. At block 1008, the hand tracking module 110 estimates the current pose 140 as the candidate pose with the minimum energy function 810.

Figure 11:
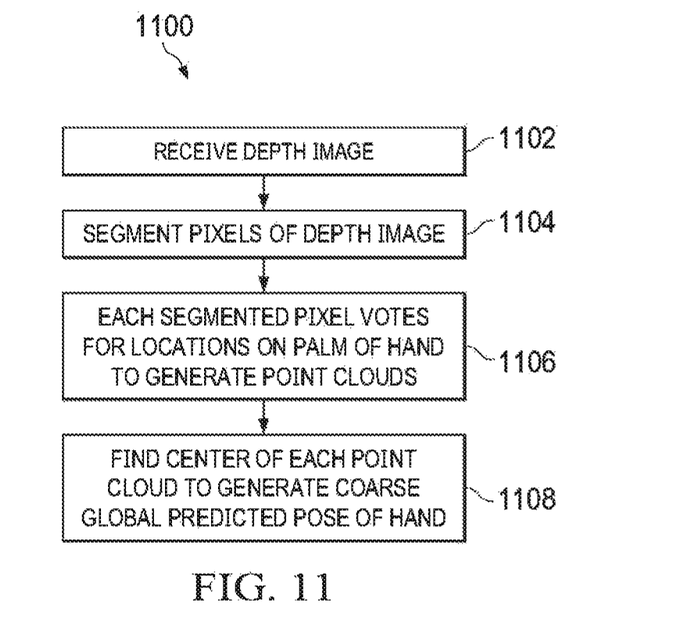
FIG. 11 is a flow diagram illustrating a method of predicting a coarse global predicted pose of a hand in accordance with at least one embodiment of the present disclosure.

FIG. 11 is a flow diagram illustrating a method 1100 of generating a coarse global predicted pose 830 of a hand 120 in accordance with at least one embodiment of the present disclosure. At block 1102, the memory 205 receives a depth image 115. At block 1104, the pixel segmenter 210 segments the pixels of the depth image 115 into pixels corresponding to the left hand, the right hand, and the background. At block 1106, each segmented pixel votes for locations on the palm of the hand 120 to generate point clouds. At block 1108, the reinitializer 215 finds the center of each point cloud to generate the coarse global predicted pose 830 of the hand 120.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
capturing, at a depth camera, a depth image of at least one hand of a user, the depth image comprising a plurality of pixels; and
identifying a current pose of the at least one hand by fitting an implicit surface model of the hand to a subset of the plurality of pixels, the fitting comprising:
interpolating a dense grid of precomputed signed distances to define a first signed distance function;
volumetrically deforming the first signed distance function based on a skinned tetrahedral mesh associated with a candidate pose to define an articulated signed distance field; and
estimating the current pose of the hand based on the articulated signed distance field.

2. The method of claim 1, wherein the subset of the plurality of pixels is identified by encoding, for each pixel of the depth image, a probability of the pixel belonging to one of a right hand, a left hand, or a background to produce a probability map.

3. The method of claim 1, further comprising initializing the candidate pose by a first pose and a second pose.

4. The method of claim 3, wherein the first pose is based on a pose from a previous frame.

5. The method of claim 4, wherein the second pose is based on a coarse global predicted pose.

6. The method of claim 5, wherein the coarse global predicted pose is generated based on:
generating a three-dimensional (3D) point cloud of the hand based on the subset of the plurality of pixels; and
predicting a global orientation of the hand based a comparison of the 3D point cloud to a plurality of known poses.

7. The method of claim 6, wherein generating the 3D point cloud comprises voting, by each pixel of the subset of the plurality of pixels, for locations on a palm of the hand.

8. A method comprising:
capturing, at a depth camera, a plurality of sequential frames of depth images of a hand, each depth image comprising a plurality of pixels;
generating a three-dimensional (3D) point cloud based on a subset of the plurality of pixels;
minimizing an energy function based on a distance between each point of the 3D point cloud and an implicitly defined surface of the hand in a candidate pose, wherein the candidate pose is generated based on:
fitting a parameterized implicit surface model of a hand to a set of points of the 3D point cloud to precompute a signed distance function by minimizing the distance from each point of the set of points to the surface;
defining an articulated signed distance function as a volumetric warp using a skinned tetrahedral mesh;
evaluating distances and derivatives of points to the implicitly defined surface of the hand; and
computing descent directions of an energy function that measures a fit of the candidate pose based on the evaluated distances and derivatives of points; and
estimating a current pose of the hand based on the candidate pose that yields the minimized energy function.

9. The method of claim 8, wherein the candidate pose is initialized by a first initialization and a second initialization.

10. The method of claim 9, wherein the first initialization is based on a pose of the hand estimated for a frame immediately preceding a current frame.

11. The method of claim 10, wherein the second initialization is based on a coarse global predicted pose.

12. The method of claim 11, wherein the coarse global predicted pose is generated based on predicting a global orientation of the hand based a comparison of the 3D point cloud to a plurality of known poses.

13. The method of claim 8, wherein generating the 3D point cloud comprises voting, by each pixel of the subset of the plurality of pixels, for locations on a palm of the hand.

14. An electronic device, comprising:
a user-facing depth camera to capture a plurality of sequential frames of depth images of at least one hand of a user, each depth image comprising a plurality of pixels; and
a processor configured to:
identify a current pose of the at least one hand by fitting an implicitly defined surface model of the hand in a candidate pose to a subset of the plurality of pixels, the fitting comprising:
interpolating a dense 3D grid of precomputed signed distance values to define a first signed distance function;
defining an articulated signed distance function as a volumetric warp using a skinned tetrahedral mesh;
evaluating distances and derivatives of points to the implicitly defined surface of the hand;
computing descent directions of an energy function that measures a fit of a candidate pose based on the distances and derivatives of points so that local search can be performed; and
estimate the current pose based on the articulated signed distance function.

15. The electronic device of claim 14, wherein the processor is further configured to identify the subset of the plurality of pixels by encoding, for each pixel of the depth image, a probability of the pixel belonging to one of a right hand, a left hand, or a background to produce a probability map.

16. The electronic device of claim 14, wherein the processor is further configured to initialize the candidate pose by a first pose and a second pose.

17. The electronic device of claim 16, wherein the first pose is based on a pose of a frame immediately preceding a current frame.

18. The electronic device of claim 17, wherein the second pose is based on a coarse global predicted pose.

19. The electronic device of claim 18, wherein the processor is further configured to:
generate a three-dimensional (3D) point cloud of the hand based on the subset of the plurality of pixels; and
predict a global orientation of the hand based a comparison of the 3D point cloud to a plurality of known poses to generate the coarse global predicted pose.

20. The electronic device of claim 19, wherein the processor is further configured to generate the 3D point cloud by each pixel of the subset of the plurality of pixels voting for locations on a palm of the hand.

* * * * *